United States Patent [19]

Markoff et al.

[11] Patent Number: 4,964,070

[45] Date of Patent: Oct. 16, 1990

[54] METHOD FOR PREPARING CAMERA-READY PHOTOSTATIC COPIES PRINTED BY RASTER PRINTERS FOR USE IN THE PUBLISHING INDUSTRY

[75] Inventors: Jay Markoff, San Diego; John R. Deubert, La Jolla, both of Calif.

[73] Assignee: Vital LaserType, Inc., San Diego, Calif.

[21] Appl. No.: 190,348

[22] Filed: May 5, 1988

[51] Int. Cl.$^5$ .............................................. G06F 3/12
[52] U.S. Cl. ...................................... 364/523; 364/519
[58] Field of Search ................... 364/519, 523; 400/61, 400/76; 358/287

[56] References Cited

U.S. PATENT DOCUMENTS

| | | | |
|---|---|---|---|
| 4,485,447 | 11/1984 | Ericsson | 364/519 X |
| 4,635,212 | 1/1987 | Hatazawa | 364/519 X |
| 4,671,683 | 6/1987 | Ueno et al. | 400/76 X |
| 4,679,093 | 7/1987 | Yaguchi | 358/287 X |
| 4,729,107 | 3/1988 | Hasegawa et al. | 364/519 |
| 4,799,172 | 1/1989 | Wood et al. | 364/519 X |

Primary Examiner—Gary V. Harkcom
Assistant Examiner—Mark K. Zimmerman
Attorney, Agent, or Firm—Nydegger & Harshman

[57] ABSTRACT

A method for increasing optical fidelity of conventional laser printers by intercepting a page description word processing output file to be sent to a printer, expanding the text in that file, rotating the expanded text, and causing the expanded, rotated text to be printed along the length of multiple sheets, along with registration marks, for later assembly into an enlarged version for photo-reduction.

2 Claims, 7 Drawing Sheets

```
%IPS-Adobe-2.0
%%Title: Untitled
%%Creator: MacDraw
%%CreationDate: Tuesday, April 19, 1988
%%Pages: (atend)
%%BoundingBox: ? ? ? ?
%%PageBoundingBox: 30 31 582 761
%%For:
%%IncludeProcSet: "(AppleDict md)" 67 0
%%EndComments
%%EndProlog
%%BeginDocumentSetup
md begin T T -31 -30 761 582 100 72 72 1 F F F F T T psu
( ; document: Untitled ) jn
0 mf
od
%%EndDocumentSetup
%%Page:  ? 1
op
0   0   x1
1   1   pen
0   0   gm
( nc  0   0   720   540   6   rc ) kp
64  gr
36  72  109  217  4  rc
0  gr
36.5  72.5  108.5  216.5  0  rc
32  gr
45  81  100  136  4  ov
0  gr
45.5  81.5  99.5  135.5  0  ov
48  gr
45  153  100  208  4  rc
0  gr
45.5  153.5  99.5  207.5  0  rc
F  T  cp
%%Trailer
cd
end
%%Pages:  1   0
%%EOF
```

*Fig. 7*

METHOD FOR PREPARING CAMERA-READY PHOTOSTATIC COPIES PRINTED BY RASTER PRINTERS FOR USE IN THE PUBLISHING INDUSTRY

BACKGROUND OF THE INVENTION

The invention relates generally to the field of printing using a raster printer, and more specifically to the field of high resolution printing of text using such printers. As used herein, raster printers include, but are not necessarily limited to, laser, ink jet, and light emitting diode printers.

In the typesetting industry today, the highest quality of typesetting is phototypesetting. Phototypesetting is accomplished by passing a beam of light through a photographic negative of a particular font and creating an image on a photosensitive medium. This method provides the sharpest resolution. Resolution is defined as the roughness or sharpness of the edges of the printed object, such as a letter of the alphabet.

Laser typesetting, which has slightly lower resolution, tries to mimic phototypesetting as closely as possible. Laser typesetting devices project a series of dots to form a given letter. The resolution of laser typesetting, as seen by the edge of the letters produced, is roughly proportional to the number of dots per square inch the laser can provide.

Laser printers currently available to the home computing consumer as well as to the commercial consumer typically have a resolution of 300 dots per linear inch (90,000 dots per square inch). This resolution is more than sufficient to create a "letter quality" document, but "stair-stepping" at the letter edges is unacceptable to publishers of higher than "letter quality" documents, such as book and magazine publishers, as well as advertisers.

Not all laser printers are unacceptable for high quality work. Publishers and advertisers prefer phototypeset originals for their publications, but will accept as "camera-ready," originals created by laser printers of a quality of 1200 dots per linear inch. These 1200 dot per linear inch laser printers, however, are currently more than ten times as expensive as the 300 dot per linear inch laser printers They are thus only economically feasible for large-quantity print shops, not for a small business using a personal computer for word processing.

Presently, one wishing to use laser typesetting for word processing originals prior to delivery to a publisher must find a print shop with both a 1200 dot per linear inch laser printer and compatible word processing computer equipment. Most print shops either have no laser printer or have a 300 dot per linear inch laser printer. In addition, the process of creating camera-ready 1200 dot per linear inch originals is so slow that many print shops using such printers also use a 300 dot per linear inch printer for proofing.

It is therefore an object of the present invention to provide a method for increasing the resolution of images produced by conventional, lower resolution raster printers.

It is another object of the invention to provide a method for producing high resolution documents using a 300 dot per linear inch laser printer.

Additional objects and advantages of the present invention will be set forth in part in the description which follows and in part will be obvious from that description or may be learned by practice of the invention. The objects and advantages of the invention may be realized and obtained by the methods and apparatus particularly pointed out in the appended claims.

SUMMARY OF THE INVENTION

The method of the present invention allows a 300 dot per linear inch laser printer to create "camera-ready" documents of sufficient quality to be acceptable to the high quality publishing and advertising industry. This increase in quality is obtained by effectively doubling the density of a 300 dot per linear inch laser printer and thereby greatly improving optical resolution or fidelity.

Specifically, a method of this invention for increasing the resolution of the type on a page printed by a printer which is coupled to a data processing system, comprises the steps, executed by the data processing system, of obtaining from the data processing system a representation of the page to be sent to the printer, expanding the scale of the page by a predetermined scale factor, rotating the expanded page 90 degrees, dividing the expanded and rotated page into a first number of subpages, the first number being determined according to the scale factor, and printing each one of the first number of subpages onto separate sheets for later assembly.

The accompanying drawings, which are incorporated in and which constitute a part of this specification, illustrate one embodiment of the invention and, together with the description, explain the principles of the invention.

BRIEF SUMMARY OF THE DRAWINGS

FIG. 7 is a depiction of a page description file created by the method depicted in FIG. 6.

DESCRIPTION OF THE PREFERRED EMBODIMENT

Reference will now be made to a preferred embodiment of this invention, an example of which is shown in the accompanying drawings.

Figure 1:
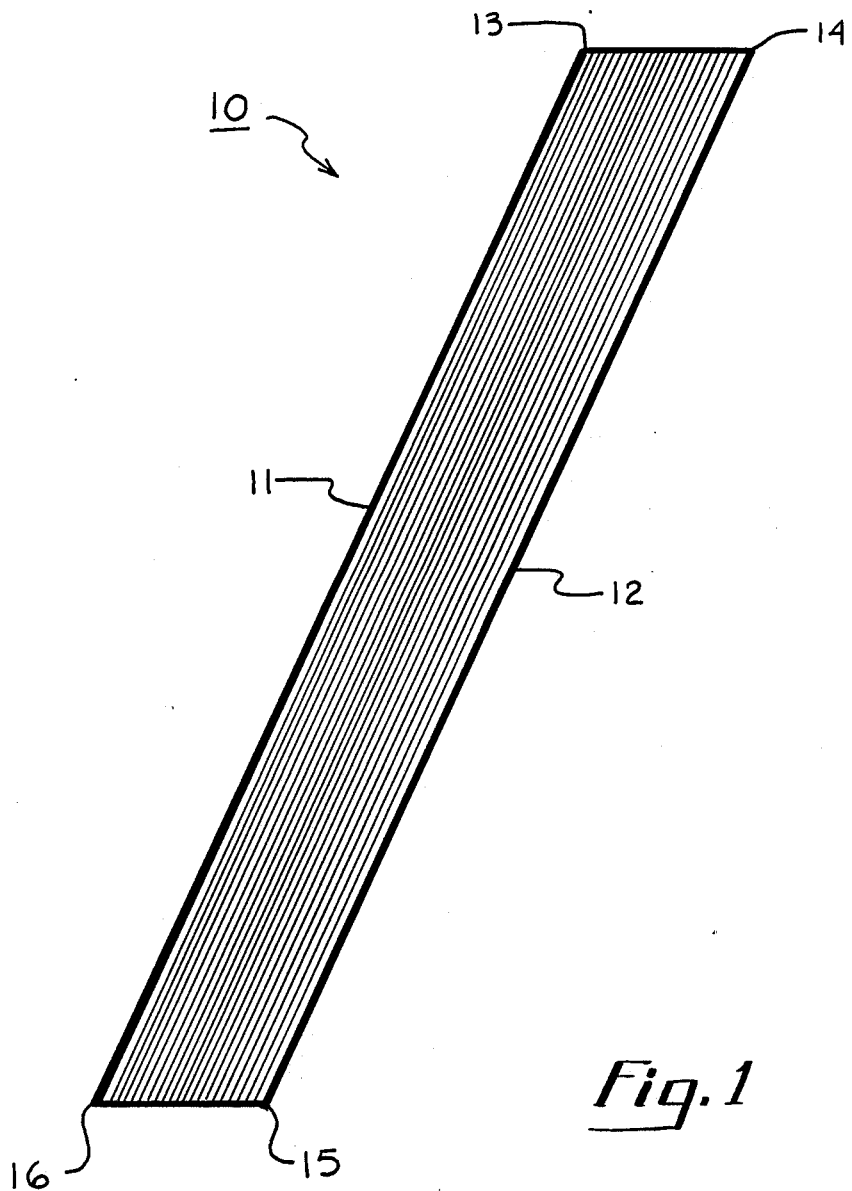
FIG. 1 depicts an enlargement of the "/" character as created by an ideal phototypesetting method.

FIG. 1 illustrates the ideal backslash "/" character 10, enlarged several times to allow closer scrutiny, as created by an ideal phototypesetting method. Slanted sides 11 and 12 of backslash character 10 of FIG. 1 are idealized as perfectly smooth. If the degree of magnification in FIG. 1 were used on an actual phototypeset backslash, the sides of the backslash would contain randomly jagged edges including defects such as serration, stair-stepping, and bleeding. Serration refers to the scalloping of an edge as in a serrated knife, and bleeding refers to the wicking of wet ink away from an edge. Corners 13, 14, 15, and 16 of backslash 10 are also ideally portrayed. The corners of an actual phototypeset backslash would be subject to rounding, bleeding, and other distortion. These normal deviations from the ideal arise as a result of the limitations on resolution of the photographic negative and the absorption characteristics of the ink and paper used. The defects of rounding, bleeding, serration, and stair-stepping that normally occur in conventional phototypesetting, however, are so infinitesimal in comparison to the size of the characters themselves that the human eye cannot detect the defects.

Figure 2:
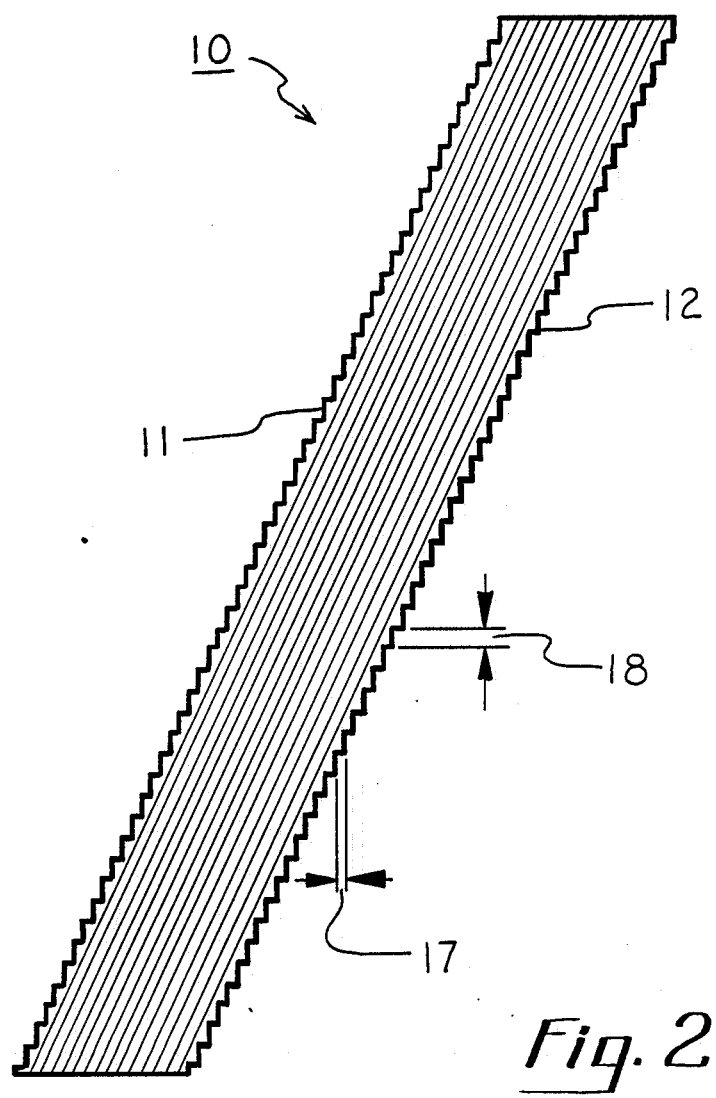
FIG. 2 depicts the "/" character as created by a 1200 dot per linear inch laser printer.

FIG. 2 depicts a magnification of a backslash character 10′ as it would appear if created on a 1200 dot per linear inch laser printer. Small stair-stepping discontinuities on edges 11′ and 12′ are depicted in FIG. 2 as 17′ and 18′, respectively. These discontinuities cause too slight of a deviation of edges 11′ and 12′ from a straight line to be detected by the human eye. As a result, the very expensive process of phototypesetting can be approximated by raster methods of sufficient resolution to create characters with no perceived loss in optical fidelity.

Figure 3:
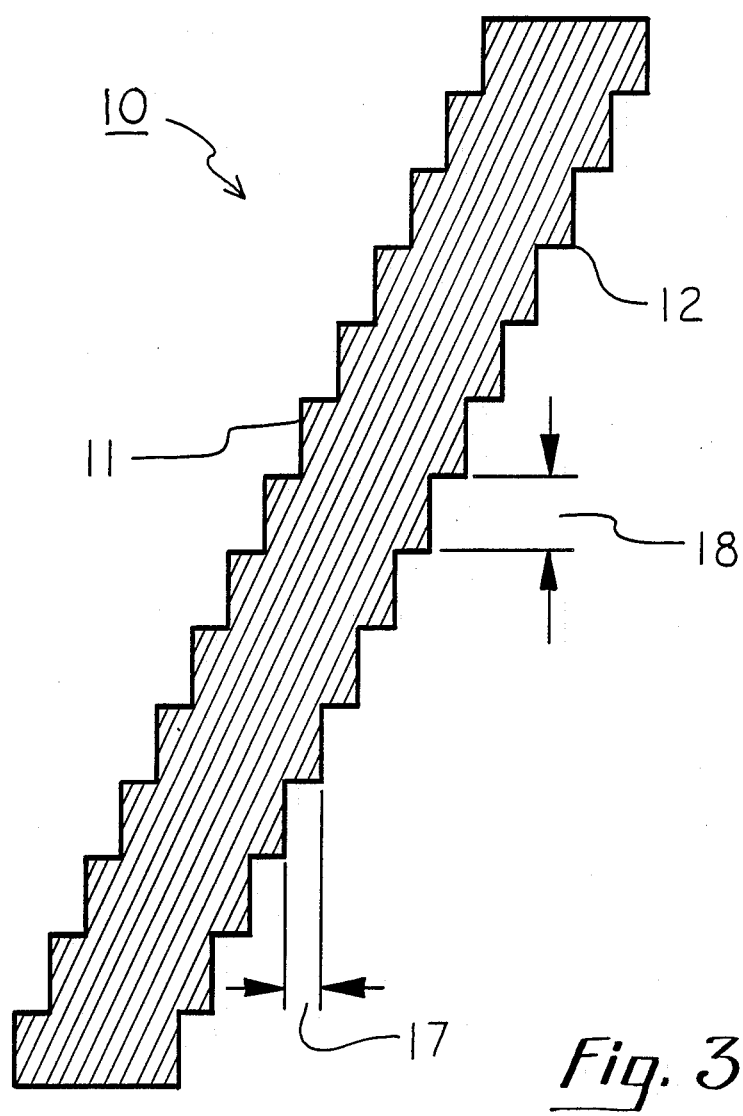
FIG. 3 depicts the "/" character as created by a 300 dot per linear inch laser printer.

Problems arise, however, as the dot density decreases. FIG. 3 shows a magnified version backslash character 10″ produced by a 300 dot per linear inch laser printer. Stair-stepping discontinuities are depicted as 17″ and 18″. Backslash character 10″ is of sufficient optical quality to be acceptable for everyday correspondence and legal documents, and is called "letter quality" in the computing and printing industries. Stair-stepping discontinuities 17″ and 18″, however, are just above the threshold of optical detection. This is why publishers of high quality documents such as books, advertisements, and magazines deem 300 dot per linear inch laser printers to be unacceptable for submission as camera-ready originals.

Figure 4:
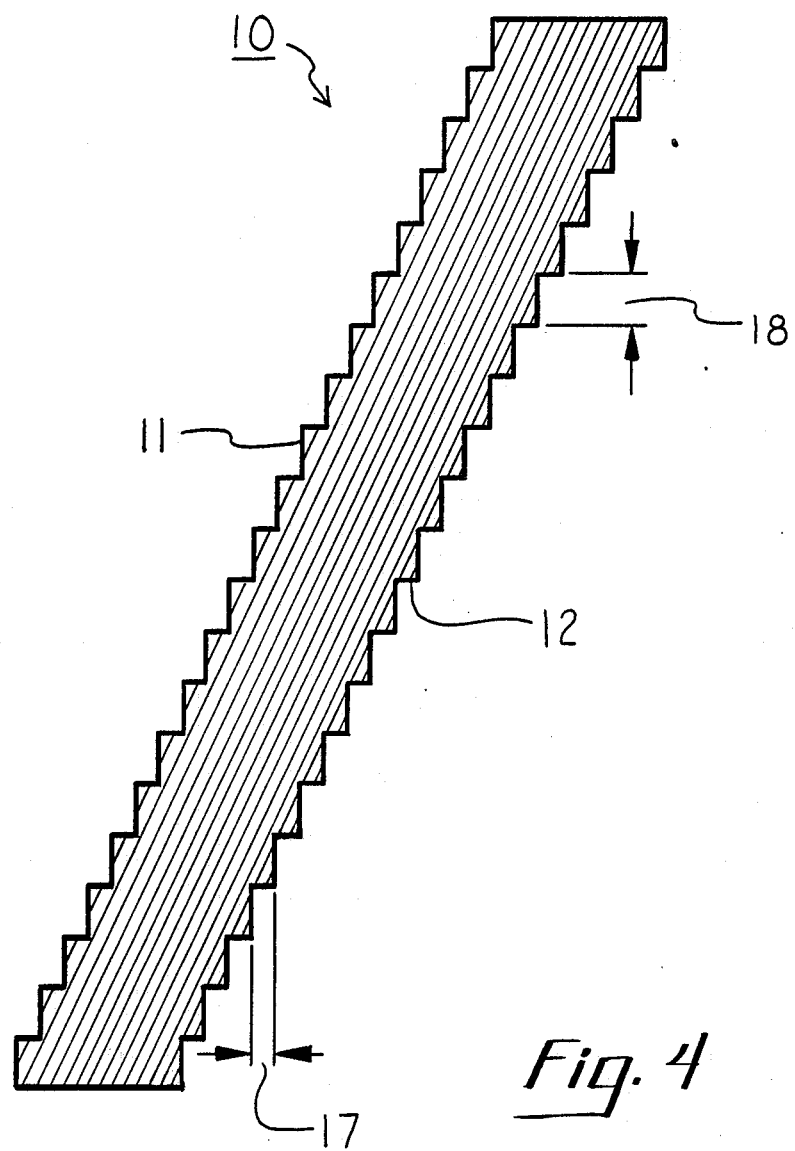
FIG. 4 depicts the "/" character after resolution was improved by a method according to that of the present invention.

FIG. 4 illustrates a backslash character 10‴ as it would be created using a preferred embodiment of this invention. The backslash still shows stair-stepping at 17‴ and 18‴, but such stair-stepping is approximately two-thirds the length of the stair-stepping (17″ and 18″) in FIG. 3.

Optical fidelity is proportional to the square of the number of dots per linear inch. Thus, reduction of the stair-step size 17‴ and 18‴ by one-third from 17″ and 18″ results in an approximate doubling of the optical fidelity. If one increases the number of dots per linear inch both vertically and horizontally from 300 to 425 (i.e., by a factor approaching the square root of 2), one doubles the density of dots. Thus, by effectively transforming a 300 dot per linear inch printer into a 425 dot per linear inch printer, the density of dots per square inch increases from 90,000 to 180,000, and the optical fidelity is thereby doubled. This level of resolution is acceptable as a camera-ready final "stat" to a quality publisher.

The preferred embodiment of this invention is implemented on a data processing system by a program which requires as an input the page description printer output file of a typical small business or personal computer word processing program. Such text would customarily be printed out on an 8-½″ by 11″ sheet of paper. The program effectively rotates the text 90 degrees and increases the area used by each character and space approximately 200 percent. In accordance with the preferred embodiment of this invention, the 300 dot per linear inch laser printer then prints the rotated and enlarged text along the length of several 8-½″ by 14″ legal-size sheets of vellum.

Preferably, each enlarged and rotated version of the original 8-½″ by 11″ page of a word processing document is printed on three 8-½″ by 14″ vellum sheets, although the number of sheets used will vary inversely with the scale factor. The top third of what would normally be printed across the width of a 8-½″ by 11″ page is printed across the length of a first 8-½″ by 14″ vellum; the middle third of the 8-½″ by 11″ page is printed across the length of a second 8-½″ by 14″ vellum; and the bottom third of what would appear across the width of the 8-½″ by 11″ page is printed across the length of a third 8-½″ by 14″ vellum.

After the text is enlarged and rotated, registration marks are printed on each 8-½″ by 14″ vellum so that they can be assembled in proper alignment to form one large 14″ by 21″ vellum. The printing area of this assembled vellum is approximately 200 percent that of a 8-½″ by 11″ sheet. The rotated and enlarged characters of this assembled vellum are, however, still printed at 300 dots per linear inch by the laser printer even though each character is 200 percent of its ultimate size. The word processing page or page layout on this assembled vellum can then be brought to a camera for making offset-plates for immediate printing, or to a "stat" camera to make original size, camera-ready pages of word processing text for subsequent printing.

Since each character was printed from a word processing application with approximately 141 percent more dots across its length and width (equivalent to about 200 percent more dots in the character's area), the ultimate characters will also have 200 percent more dots in the character's area when photographed. The optical fidelity or resolution of the laser-printed character, which is proportional to the number of dots per square inch, is thus effectively doubled. This invention thus brings the 300 dot per linear inch, small business laser printer into optical competition with industry standard laser printers costing up to ten times as much. With this invention, the small business word processing author may now compete with large print shops using 1200 dot per linear inch laser printers.

As an aid to the photostat camera operator, the invention preferably further includes the recordation of enlargement and reduction instructions in the form of blow-up or reduction percentages in the margin outside the visual page area. The registration marks are also preferably printed outside the visual page area.

Figure 5:
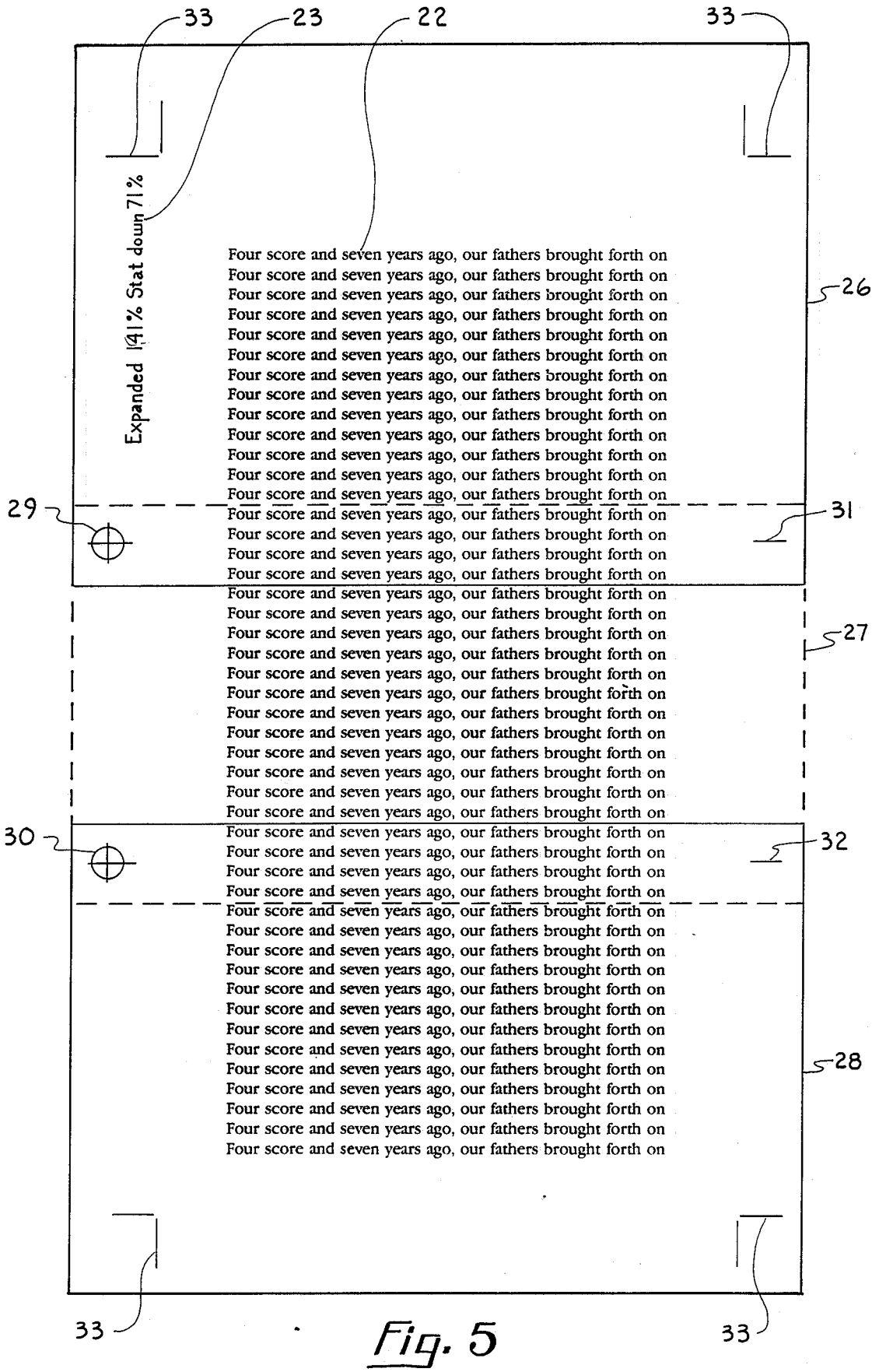
FIG. 5 depicts a single page of word processing text after it has been rotated, enlarged, and printed on three aligned legal size sheets according to an embodiment of the present invention prior to photo-reduction.

FIG. 5 illustrates the assembled output of a 300 dot per linear inch laser printer created in accordance with the preferred embodiment of the present invention and suitable either for photo-reduction by a plate making camera or the creation of a stat by a stat making camera. The first 8-½″ by 14″ vellum 26 is shown bordered by a solid line; the second 8-½″ by 14″ vellum 27 is shown bordered by dashed line and is overlapped at the top by vellum 26; the third 8-½″ by 14″ vellum 28 is shown by solid lines and overlaps the second 8-½″ by 14″ vellum 27.

At the same time as it prints text 22, the laser printer preferably prints registration marks 29, 30, 31, 32, and 33 (e.g., 33, 33′, 33″, 33‴). These registration marks make it possible to align the three 8-½″ by 14″ vellums 26, 27, and 28 prior to photo-reduction to 8-½″ by a 11″ size. The laser printer also preferably prints instructions 23 for the camera operator. Such instructions might indicate how much the present page has been expanded and how much the photographer should reduce the page to achieve the 8-½″ by 11″ size.

Figure 6:
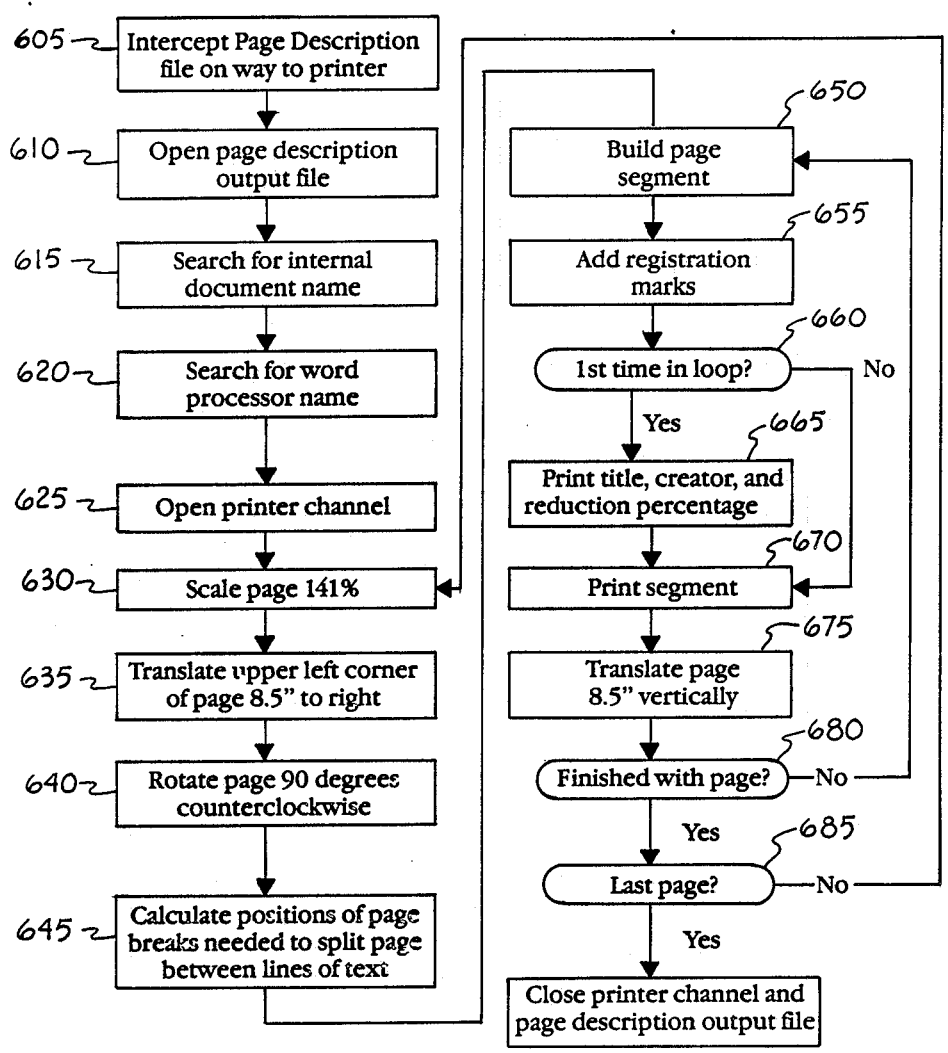
FIG. 6 is a flow chart depicting a preferred method of carrying out the present invention.

FIG. 6 shows a flow chart 600 of a preferred method of increasing the resolution of a page from a document to be sent to a laser printer in accordance with the present invention. A detailed implementation of the procedure in flow chart 600 on a conventional data processing system with a standard 300 dot per linear inch printer is well within the abilities of the artisan of ordinary skill given the additional information in this description of the invention.

The preferred method in flowchart 600 assumes that a word processing program or similar software has been used to prepare a document and to place that document in a text file. The method also assumes that some other program, such as the PostScript® program from Adobe Systems, Inc., formats the document in that text file into a page description file for output to a laser printer. FIG. 7 shows an example of a page description file 70 in a form in which it would be sent to the laser printer.

Because each laser printer receiving a page description file actually includes a special use computer itself, often with the character fonts stored internally in outline form, the page description file need only describe text, text positions, text orientation, font, and font size. Whatever the font size, the outline of the character is automatically filled with dots by the logic of the laser printer.

In accordance with the preferred method of this invention, the first step is to intercept the page description file for the current page of the document before it is sent to the laser printer (Step 605). This step is usually implemented by the host operating system or the word processing program.

Next, the page description output file is opened (Step 610) and searches are made for the internal name of the document being printed (Step 615) and for the name of the word processor which generated the document (Step 620). The location within the page description file of the internal document name and the name of the generating word processing programs is well marked. Locations are reviewed until the names are located. In the event no name is found, a dummy name is used.

Next, the printer channel for the laser printer must be opened (Step 625). Following that, the text on the document page in the page description file is enlarged approximately 141 percent in the horizontal and vertical directions (Step 630).

The upper left hand corner of the enlarged text in the page description file must then be translated 8-½" to the right (Step 635). The purpose of this translation is so that the next step, rotating the enlarged text 90 degrees counterclockwise about the upper right-hand corner, can take place (Step 640).

After rotating the text, the page break positions must be calculated (Step 645). Preferably, the page break positions are first calculated by dividing the scaled text in the page outline file into thirds. Once these initial page breaks are calculated, they are examined to see whether the breaks fall between lines of text. If not, they must be adjusted slightly to fall between the lines of text.

After calculating the page breaks, the next one-third segment of the expanded, rotated, translated, and divided page is built up in memory (Step 650). Then the registration marks for each of the pages must be added to assist in later alignment and assembly (Step 655). Preferably, these registration marks occur at prescribed positions outside the text portion of the file.

Next, a determination must be made as to whether the text currently being printed is at the top "third" of the enlarged text of the document (Step 660). If so, then the title, the creator, and the typesetting directions (e.g., reduction percentage information) are added to the page segment outside of the text area (Step 665). The title, creator and reduction percentage need not be added to the two bottom thirds of the scaled text. After the page segment is built, the registration marks added and, if appropriate, the title, creator and reduction percentage printed, the page segment is printed on an 8-½" by 14" vellum (Step 670).

The text in the page output file is then translated 8-½" vertically so the next "third" of the page can be printed (Step 675). The next determination is whether the entire original text, that is, all three "thirds" of the enlarged text, has been printed (Step 680). If not, then the next "third" of the text is built (loop beginning with step 650).

If so, then a determination is made whether this is the last page of the original document (Step 685). If not, then the next page is expanded, rotated, translated, divided, built and printed (loop beginning with Step 630). Otherwise, the printer channel is closed as is the page description output file (Step 690).

The procedure indicated in FIG. 6 is not the only procedure by which the invention may be effected. Persons of ordinary skill in the art will realize other methods of carrying out the present invention.

It will be apparent to those skilled in the art that modifications or variations can be made in the methods and apparatus of this invention. The invention in its broader aspects is therefore not limited to the specific details, representative methods and apparatus, and illustrative examples shown and described. Departure may be made from such details without departing from the spirit or scope of the general inventive concept.

What is claimed is:

1. A method for increasing the optical fidelity of the characters printed on a plurality of pages by a raster printer which is coupled to a data processing system which pages are assembled together and photo-reduced, the method comprising the steps, executed with the aid of said data processing system, of
   obtaining from said data processing system a representation of said page including its width and length dimensions to be sent to said raster printer;
   expanding said width and length dimensions of said page by a predetermined scale factor;
   rotating said expanded page 90 degrees;
   dividing said expanded and rotated page into a first number of subpages, said first number being determined according to said scale factor; and
   printing each one of said first number of subpages onto separate sheets for later assembly;
   translating the upper-left hand corner of the expanded page representation to the right by an amount corresponding to the width of said sheets of paper; and
   rotating said translated page 90 degrees to allow display of said enlarged text across the length of said enlarged page;
   printing registration marks onto said sheets;
   assembling said subpage by aligning said registration marks; and
   photo-reducing said assembled subpages onto a photographic plate or stat.

2. The method according to claim 1 further including the step of printing reduction instructions in the form of reduction percentages onto at least one of said sheets.

* * * * *